(No Model.)
A. THOMPSON.
GLORY HOLE FURNACE.
No. 499,058.  Patented June 6, 1893.
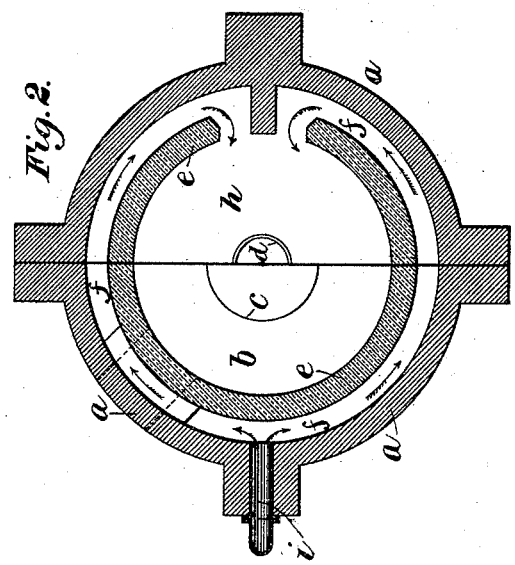
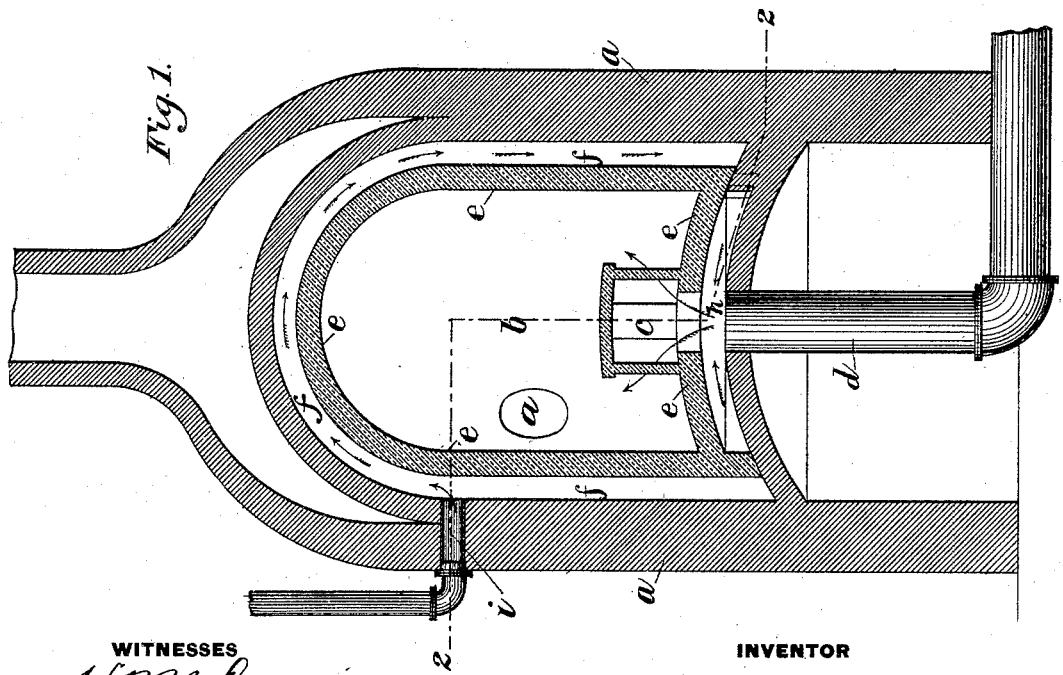
WITNESSES  INVENTOR

UNITED STATES PATENT OFFICE.

ADDISON THOMPSON, OF HUNTINGTON, WEST VIRGINIA.

GLORY-HOLE FURNACE.

SPECIFICATION forming part of Letters Patent No. 499,058, dated June 6, 1893.

Application filed December 3, 1892. Serial No. 453,934. (No model.)

*To all whom it may concern:*

Be it known that I, ADDISON THOMPSON, of Huntington, in the county of Cabell and State of West Virginia, have invented a new and useful Improvement in Glory-Hole Furnaces, of which the following is a full, clear, and exact description, reference being had to the accompanying drawings, forming part of this specification, in which—

Figure 1 is a vertical sectional view of a glory-hole furnace showing my improvement; and Fig. 2 is a horizontal sectional view on the line $x$—$x$ of Fig. 1.

Like letters of reference indicate like parts wherever they occur.

Heretofore producer gas has not been successfully used in glory-hole furnaces owing to the fact that the heat produced thereby is not sufficiently intense and combustion has been imperfect; and the object of my improvement is to obviate this difficulty, and it consists in an improved arrangement of the glory-hole whereby the air for supporting combustion is heated before passing to the combustion-chamber, and it is especially adapted to use in connection with manufactured, or what is known as producer gas.

In the drawings, $a$ represents the outer walls of the glory-hole, $b$ the combustion-chamber, and $c$ the deflector or gas-burner, into which enters the gas-supply pipe $d$, leading from the gas-producer. Situate within the outer walls $a$ are inner walls $e$ $e$, separated from the outer walls so as to leave an air-heating space $ff$ at the sides, top and bottom of the combustion-chamber, which air space or flues open into the mixing chamber $h$. Opening into the upper part of the air-heating flue $f$ is the air-pipe or conduit $i$ which leads from the blower.

The operation is as follows:—The air passes from the blower through the pipe $i$ opening into the chamber or flue $f$, and thence through the flue over the dome of the combustion chamber $b$ down the side of the same and under the bottom, and thence into the mixing chamber $h$ at the mouth of the gas pipe $d$ leading from the producer, where it mingles with the gas as it passes to the burner $c$, which has a deflecting top and side ports leading into the combustion chamber $b$. Owing to the air passing around the walls of the combustion-chamber, it becomes thoroughly heated and causes complete combustion of the heavy producer gas, thereby increasing the intensity of the flame.

The advantages of my improvement are that the air is thoroughly heated by passing through commodious passages extending over a large area of heating surface and is led by an unobstructed path to the mixing chamber where it unites with the gas and being then deflected as it passes into the combustion-chamber thorough combustion is insured.

I am aware that it is not new to heat air for the purpose of aiding combustion of gases, and I do not desire to claim the same broadly; but What I do claim, and desire to secure by Letters Patent, is—

In a glory-hole furnace, the combination of the combustion-chamber $b$, an air-chamber $f$ extending around the sides of the walls and over the dome of the chamber $b$, a mixing chamber $h$ situate below the floor of the chamber $b$, ports leading from the bottom of the chamber $f$ to the mixing chamber $h$, a deflecting burner $c$ situate at the bottom of the chamber $b$, a port leading from the chamber $h$ to the burner, an air-supply pipe $i$ leading to the chamber $f$, and a gas-supply conduit $d$ leading to the chamber $h$; substantially as described.

In testimony whereof I have hereunto set my hand this 9th day of November, A. D. 1892.

ADDISON THOMPSON.

Witnesses:
 W. M. CAMPBELL,
 A. A. CURTIS.